3,462,440
1,4-BIS(2-INDOL-3-YLETHYL)PIPERIDINES
Scott J. Childress, Philadelphia, and John L. Archibald, Malvern, Pa., assignors to American Home Products Corporation, New York, N.Y., a corporation of Delaware
No Drawing. Filed Dec. 3, 1965, Ser. No. 511,311
Int. Cl. C07d 57/00; A61k 27/00
U.S. Cl. 260—293    14 Claims

ABSTRACT OF THE DISCLOSURE

The compounds are 1,4-bis(2-indol-3-ylethyl)piperidines which are useful as tranquilizers and cardiovascular agents.

---

This invention relates to chemical compounds that are derivatives of piperidines, and, more particularly to 1,4-bis(2-indol-3-ylethyl)piperidines, their pharmaceutically acceptable salts, and methods for producing them.

The compounds of the invention in the form of the free bases may be represented by the formula:

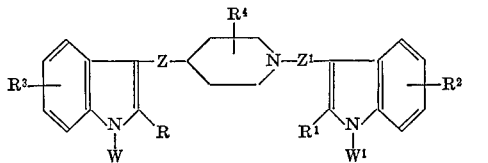

wherein W and $W^1$ each may be hydrogen, lower alkyl or aralkyl; R and $R^1$ each may be hydrogen or lower alkyl; $R^2$ and $R^3$ each may be hydrogen, halogen, alkoxy, or hydroxy; Z and $Z^1$ each may be alkylene moieties of two or three $CH_2$ units which, optionally, may be further substituted by lower alkyl; and $R^4$ may be hydrogen or lower alkyl.

It has been discovered that compounds meeting the above described qualifications, whether as free bases or the acid-addition salts thereof, are useful as tranquilizers, and cardiovascular agents, e.g., anti-hypertensives.

In the production of the piperidine derivatives of the invention, the free bases may generally be prepared by reacting a 3-[2-(4-piperidyl)lower alkyl]indole with a (halo(lower)alkyl) indole in an inert organic reaction medium in the presence of a halogen acceptor; e.g. sodium carbonate. Other acid acceptors or mildly basic materials may be substituted in the reaction medium such as pyridine, sodium or potassium bicarbonate, or like substances, or the 4-piperidyl indole may be reacted with an indole glyoxyloyl or indoleacetyl halide and the resulting product reduced.

Alternatively, where deemed desirable, the 4-pyridyl analogue of the 4-piperidyl indole derivatives may be substituted as reactant with the (halo(lower)alkyl) indole, and the resulting quaternary salt subsequently hydrogenated to obtain the desired compound falling within Formula I above. The inert solvents used in the reactions may be any of the conventional type such as ethanol, isopropanol, methylene chloride, and the like. The final products may be purified and recovered by conventional procedures of filtration, elution, crystallization, and the like.

Many of the reactants employed in the process of this invention are known compounds which are readily available from commercial sources. Others which are not commercially available can easily be prepared in accordance wtih standard organic procedures well known to those skilled in the art. For example, to obtain compounds of the invention wherein the N atoms in the 1-positions of the respective indole moieties are substituted, indole starting materials may be employed wherein said N atoms are initially substituted. Such starting materials then may be formed as the sodium salts thereof, which may then be reacted with a suitable halide for furnishing the desired substitutent in the indole reactants. Alternatively, N-substituents may be introduced after a bis-compound has been formed.

As indicated previously, compounds falling within the scope of the formula given above may be used in the form of their acid-addition salts while still retaining their effectiveness as tranquilizers. The salts in many instances provide greater flexibility in therapeutic use, since they may impart various degrees of water-solubility to an otherwise substantially insoluble base. With regard to the acid-addition salts, as is well known in the pharmaceutical art, either organic or inorganic acids may be used as long as they do not substantially increase the toxicity of the compounds. For example, the compounds which are useful as bases per se may be used in the form of their salts with suitable organic acids such as acetic, propionic, tartaric, citric and the like, or inorganic acids such as hydrochloride, hydrobromic, sulfuric, phosphoric, and the like.

The acid-addition salts of the bases of the invention may be prepared by procedures now well known to those skilled in the art. For example, a selected novel free base may generally be dissolved in a suitable solvent and the selected acid may then be added thereto. Since the preparation of acid-addition salts per se is well known, it need not be described in any greater detail here.

When the compounds of the invention are employed as tranquilizers, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules which may contain standard excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about .05 mg. to about 15 mg. per kg. of body weight per day, although as aforementioned variations will occur. However, a dosage level that is in the range of from about 0.2 mg. to about 5 mg. per kg. of body weight per day is most desirably employed in order to achieve effective results.

The following examples are given by way of illustration and are not be construed as limitations of this invention, many variations of which are possible without departing from the scope and spirit thereof.

EXAMPLE I 1,4-bis(2-indol-3-ylethyl)piperidine, hydrobromide

A mixture of 3-[2-(4-piperidyl)ethyl]indole (2.0 g.) sodium carbonate (1.9 g.), water (0.32 ml) and isopropanol (15 ml.) was stirred and refluxed, while 3-(2-chloroethyl)indole (1.58 g.) in isopropanol (4 ml.) was added dropwise. Stirring and refluxing were continued for 16 hr., then the hot mixture was filtered and the filtrate evaporated. The residue was stirred with ether and filtered from some insoluble material. The filtrate was cooled and made acid with hydrogen bromide to give the hydrobromide (3.2 g.). Recrystallization from methyl Cellosolve-water gave the product as its hydrobromide salt (2.28 g.) M.P. 249–251°.

Analysis.—Calcd. for $C_{25}H_{29}N_3 \cdot HBr$: C, 66.37; H, 6.64; N, 9.29; Br, 17.67. Found: C, 65.81; H, 6.77; N, 9.24; Br, 17.6.

EXAMPLE II 1-(2-indol-3-ylethyl)-4-[2-(2-methylindol-3-yl)-ethyl] piperidine 2-methyl - 3 - [2-(4-piperidyl)ethyl]indole (2056 g.) in methylene chloride (1.2 1.) and sodium bicarbonate (50 g.) in water (500 ml.) were stirred together, while 3-indoleglyoxylyl chloride (16.8 g.) was added portionwise during 3 hr. Stirring was continued for 2 hr.; then the methylene chloride layer was washed, dried and evaporated. The residual foam in 1,2-dimethoxyethane (300 ml.) was added dropwise to a stirred suspension of lithium aluminum hydride (25 g.) in 1,2-dimethoxyethane (300 ml.). The mixture was stirred and refluxed for 4 hr., then stirring was continued overnight. Just sufficient water to decompose the excess hydride was added and the granular precipitate was filtered off. The filtrate was evaporated in vacuo and the residue, in ethyl acetate, was chromatographed on basic alumina. The fluorescent band was eluted with ethyl acetate. Evaporation of the fluorescent fraction gave a pale yellow foam which was dissolved in ether and filtered from a small amount of insoluble material. The filtrate was made acid with ethereal hydrogen chloride, and the precipitated hydrochloride was collected. Stirring the precipitated hydrochloride with ethanol removed some impurity and gave a colorless solid (23 g.) M.P. 231–3°, which could not be recrystallized. This material was turned back to the base by stirring with an ether/10% sodium hydroxide solution, which gave a rigid foam after evaporation. The foam, in ether, was treated with oxalic acid, and the oxalate salt was obtained. The latter was stirred with boiling 2-methoxyethanol to give a pale pink solid M.P. 165–9° (decomp.) (17.5 g.). Part of this solid material was converted back to the base again to provide the product as a rigid foam that could not be crystallized. On a basic alumina thin layer plate, developed with cyclohexane-chloroform-diethylamine, it had $R_f$ 0.39.

Analysis.—Calcd. for $C_{26}H_{31}N_3$: C, 80.99; H, 8.11; N, 10.90. Found: C, 80.99; H, 7.94; N, 10.91.

EXAMPLE III 1-(2-indol-3-ylethyl)-4-[2-(1-benzylindol-3-yl)ethyl] piperidine

A mixture of 1-benzyl-3-[2-(4-pyridyl)ethyl]indole, hydrochloride (15 g.), water (30 ml.), ethanol (23 ml.), and platinum oxide (0.3 g.) was hydrogenated at 50 p.s.i. initial pressure for 20 hr. After filtering from the catalyst, the ethanol was evaporated off in vacuo, and the residue was diluted with water and basified with sodium hydroxide solution. Extraction with ether (3 times), and evaporation of the washed and dried extracts, gave a colorless oil which crystallized on scratching. Recrystallization from pentane provided 1-benzyl-3-[2-(4-piperidyl)ethyl]indole as colorless needles M.P. 51–3°.

Analysis.—Calcd. for $C_{22}H_{26}N_2$: C, 82.97; H, 8.23; N, 8.80. Found: C, 83.00; H, 8.22; N, 8.90.

The foregoing compound (5.2 g.) and finely ground sodium carbonate monohydrate (1.9 g.) in isopropanol (25 ml.) were stirred and refluxed while 3-(2-bromoethyl)indole (3.7 g.) in isopropanol (10 ml.) was added dropwise. Stirring and refluxing were continued for 18 hr., then the hot mixture was filtered, and the filtrate was evaporated. The residue was stirred with ether and filtered from some insoluble material. The filtrate was cooled in an ice bath and made just acid with ethereal hydrogen chloride to precipitate a hydrochloride (5.7 g.). This was stirred with water at ca. 80°, filtered and dried. Trituration with acetone gave a gum at first, which then solidified. Recrystallization from ethanol gave the product as its hydrochloride salt (3.7 g.), M.P. 199–200°.

Analysis.—Calcd. for $C_{32}H_{35}N_3$: C, 77.16; H, 7.29; N, 8.45; Cl, 7.12. Found: C, 77.10; H, 7.23; N, 8.66; Cl, 7.21.

EXAMPLE IV 1,4-bis[2-(1-methylindol-3-yl)ethyl]piperidine

The free base of the product of Example I (2.0 g.) was added portionwise with stirring to sodamide in liquid ammonia prepared from liquid ammonia (150 ml.) and sodium (248 mg.), with ferric nitrate hydrate (one crystal) as catalyst. One hour later, a solution of methyl iodide (1.56 g.) in ether (10 ml.) was added dropwise. Stirring was continued for 2 hr.; then the ammonia was allowed to evaporate overnight. Ether (100 ml.) and water (100 ml.) were added, the mixture was stirred and the aqueous layer was shaken with more ether. The ether layers were washed, dried, and evaporated to give a colorless solid. Recrystallization from acetone-water gave colorless needles (1.2 g.) M.P. 119–122°. Recrystallization from acetone provided the product as colorless needles. M.P. 123–4°.

Analysis.—Calcd. for $C_{27}H_{33}N_3$: C, 81.16; H, 8.33; N, 10.52. Found: C, 81.24; H, 8.36; N, 10.51.

EXAMPLE V 1-(2-indol-3-ylethyl)-4-[2-(1-methylindol-3-yl)ethyl] piperidine 1-methyl-3-[2-(4-piperidyl)ethyl]indole (4.84 g.) was dissolved in isopropanol (25 ml.) and stirred with sodium carbonate monohydrate (3.0 g.) under reflux, while 3-(2-bromoethyl)indole (4.48 g.) in isopropanol (10 ml.) was added dropwise. Stirring and refluxing were continued for 16 hr.; then the hot mixture was filtered, and the filtrate was evaporated. The residue was triturated with ether and filtered from some insoluble material (2.1 g.). The cooled filtrate was acidified with ethereal hydrogen chloride to give a colorless solid (5.7 g.), M.P. indefinite 80°. This was triturated with water, then acetone, and then converted back to the free base and chromatographed on grade 1 basic alumina (3×20 cm.), eluting with ethyl acetate (250 ml. fractions). The second fraction was evaporated and the resulting foam in ether was converted back to the hydrochloride. This was stirred with a methylene chloride/10% potassium carbonate solution; and the organic layer was washed, dried and evaporated to give the product as a rigid colorless noncrystallizable foam.

Analysis.—Calcd. for $C_{26}H_{31}N_3$: C, 80.99; H, 8.11; N, 10.90. Found: C, 80.94; H, 7.99; N, 10.64.

EXAMPLE VI

1-[2-(3-indolyl)ethyl]4-[2-(5-methoxy-3-indolyl)ethyl] piperidine, hydrobromide 5-methoxy-3-[2-(4-pyridyl)ethyl]indole (2.52 g.) and 3-(2-bromoethyl)-indole (2.24 g.) were dissolved in absolute ethanol (50 ml.) and kept at room temperature for one week. Platinum oxide (0.2 g.) was added, and the mixture was hydrogenated at 50 p.s.i. and 50° C. for 24 hr. The catalyst plus precipitate was filtered into an extraction thimble and extracted with methanol for one hr. On concentrating the extract and leaving overnight, the crude product crystallized (1.6 g., M.P. 198–205°). Two recrystallizations from methanol gave the product as prisms, M.P. 211–212°.

Analysis.—Calcd. for $C_{26}H_{31}N_3O \cdot HBr$: C, 64.73; H, 6.69; N, 8.71; Br, 16.59. Found: C, 64.54; H, 6.52; N, 8.73; Br, 16.40.

EXAMPLE VII 1-(2-indol-3-ylpropyl)-4-[2-(1-phenethylindol-3-yl)ethyl] piperidine Following the procedure of Example III, but utilizing as the indole derivative starting materials, 1-phenethyl-3-[2-(4-pyridyl)ethyl]indole and 3-(2-bromo-propyl)indole, the compound 1-(2-indol-3-ylpropyl)-4-[2-(1-phenethylindol-3-yl)ethyl]piperidine is obtained.

EXAMPLE VIII

The procedure of Example VI is followed utilizing the indole derivative reactants to obtain the corresponding bis(indolylalkyl)piperidine compounds as given in the table below:

Reactants (a)
5-hydroxy-3-[2-(4-pyridyl)ethyl]-indole and 3-(3-bromopropyl)indole (b)
6-chloro-3-[2-(4-[2-ethyl]-pyridyl)-ethyl]indole and 3-(3-bromo-propyl-2)indole (c)
7-bromo-3-[2-(4-pyridyl)ethyl]indole and 3-(3-bromobutyl-1)indole Final compounds
1-[3-(3-indolyl)propyl]-4-[2-(5-hydroxy-3-indolyl)-ethyl]-piperidine.
1-[1-(3-indolyl)-1-methylethyl]-2-ethyl-4-[2-(6-chloro-3-indolyl)ethyl]-piperidine
1-[3-(3-indolyl)-1-methylpropyl]-4-[2-(7-bromo-3-indolyl)ethyl]-piperidine

EXAMPLE IX

1-[2-(2-methylindol-3-yl)ethyl]-4-[2-(3-indolyl)ethyl] piperidine (a) A mixture of 3-[2-(4-piperidyl)ethyl]indole (23 g.) in chloroform (350 ml.) and potassium bicarbonate (23 g.) in water (100 ml.) was stirred vigorously and 2-methylindol-3-glyoxyloyl chloride (23 g.) in ethyl acetate (500 ml.) was added slowly dropwise. After 1 hr., the organic layer was separated, washed, dried and evaporated. Trituration of the residual oil gave a solid which was recrystallized from ethanol to obtain 4-(2-indol-3-ylethyl)-1-(2-methylindole-3-glyoxyloyl)-piperidine, M.P. 202–3°.

Analysis.—Calcd. for $C_{26}H_{27}N_3O_2$: C, 75.52; H, 6.58; N, 10.16. Found: C, 75.41; H, 6.47; N, 9.83.

(b) The foregoing product (20 g.) was added portionwise to a stirred suspension of lithium aluminum hydride (10 g.) in dry 1,2-dimethoxyethane (500 ml.). The reaction mixture was stirred under reflux for 18 hrs., then cooled. Water (30 ml.) was added dropwise with stirring. The inorganic solid was filtered off and washed well with 1,2-dimethoxyethane. Evaporation of the filtrate gave an oil which crystallized on standing. Recrystallization from ethyl acetate provided the title compound (9.2 g.), M.P. 154–5°.

Analysis.—Calcd. for $C_{26}H_{31}N_3$: C, 80.99; H, 8.11; N, 10.90. Found: C, 81.05; H, 8.25; N, 10.63.

EXAMPLE X 1,4-bis[2-(2-methylindol-3-yl)ethyl]piperidine (a) 4 - [2 - (2-methylindol-3-yl)ethyl]-1-(2-methylindole-3-glyoxyloyl)piperidine was prepared by the procedure of Example IX(a), utilizing 2-methyl-3-[-(4-piperidyl)ethyl]indole in place of 3-[2-(4-piperidyl)ethyl]indole. The product was crystallized from ethyl acetate (73% yield) M.P. 228–9°.

Analysis.—Calcd. for $C_{27}H_{29}N_3O_2$: C, 75.85; H, 6.48; N, 9.83. Found: C, 75.53; H, 7.04; N, 9.48.

(b) The title product, obtained by reduction of the product of (a) in the same way as in Example X(b), was similarly crystallized from ethyl acetate (76% yield) M.P. 165–7°.

Analysis.—Calcd. for $C_{27}H_{33}N_3$: C, 81.16; H, 8.33; N, 10.52. Found: C, 81.01; H, 8.55; N, 10.40.

EXAMPLE XI

1-[2-(3-indolyl)ethyl]-4-[2-(2-methyl-3-indolyl)ethyl] pyridinium bromide, hydrate 2-methyl-3-[2-(4-pyridyl)ethyl]indole (2.36 g.) and 3-(2-bromoethyl)indole (2.24 g.) were dissolved in acetonitrile (10 ml.) and heated under reflux for 16 hr. The reaction mixture was cooled, the solvent decanted, and the residue boiled with water. The resultant solid was recrystallized from aqueous ethanol to provide yellow prisms, M.P. 145–7°.

Analysis.—Calcd. for $C_{26}H_{26}N_3BrH_2O$: C, 65.28; H, 5.90; N, 8.79; Br, 16.70. Found: C, 65.66; H, 5.74; N, 8.69; Br, 16.8.

EXAMPLE XII

1-[2-(3-indolyl)ethyl]-4-[2-(2-isopropyl-3-indolyl)ethyl] pyridinium bromide

Following the procedure of Example XI, but utilizing 2-isopropyl-3-[2-(4-pyridyl)ethyl]indole in place of 2-methyl-3-[2-(pyridyl)ethyl]indole, the title compound was obtained and then crystallized from ethanol, M.P. 244–5°.

Analysis.—Calcd. for $C_{29}H_{30}BrN_3$: C, 69.58; H, 6.03; N, 8.39; Br, 15.96. Found: C, 69.42; H, 6.42; N, 8.34; Br, 16.1.

What is claimed is:

1. A compound selected from the group consisting of those having the formula:

I.

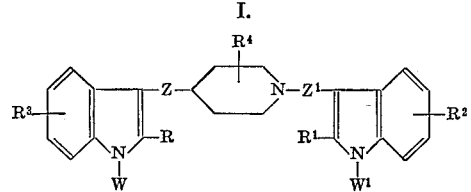

and the pharmaceutically-acceptable acid-addition salts thereof; wherein W and $W^1$ are each selected from the group consisting of hydrogen, lower alkyl and phenyl (lower)alkyl; R and $R^1$ are each selected from the group consisting of hydrogen and lower alkyl; $R^2$ and $R^3$ are each selected from the group consisting of hydrogen, halogen, lower alkoxy, and hydroxy; $R^4$ is selected from the group consisting of hydrogen and lower alkyl; and Z and $Z^1$ are each alkylene moieties selected from those having the formula:

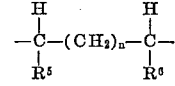

wherein $R^5$ and $R^6$ are each selected from the group consisting of hydrogen and methyl; and $n$ is an integer selected from the group consisting of zero and one.

2. 1,4-bis-(2-indol-3-ylethyl)piperidine, hydrobromide.
3. 1 - (2 - indol-3-yl-ethyl)-4-[2-(2-methylindol-3-yl)-ethyl]-piperidine.
4. 1 - (2 - indol-3-ylethyl)-4-[2-(1-benzylindol-3-yl) ethyl]-piperidine.
5. 1,4-bis[2-(1-methylindol-3-yl)ethyl]piperidine.
6. 1 - (2 - indol - 3-ylethyl)-4-[2-(1-methylindol-3-yl) ethyl]-piperidine.
7. 1 - [2 - (indol-3-yl)ethyl]-4-[2-(5-methoxyindol-3-yl)ethyl]-piperidine, hydrobromide.
8. 4 - [2 - (indol-3-yl)-ethyl]-1-(2-methylindol-3-yl-3-glyoxyloyl)-piperidine.
9. 1 - [2-(2-methylindol-3-yl)-ethyl]-4-[2-(indol-3-yl) ethyl]-piperidine.

10. 4 - [2-(2-methylindol-3-yl)-ethyl]-1-(2-methylindol-3-glyoxyloyl)piperidine.

11. 1,4-bis[2-2-methylindol-3-yl)ethyl]piperidine.

12. 1 - [2-(indol-3-yl)ethyl]-4-[2-(2-methylindol-3-yl)ethyl]-pyridinium bromide, hydrate.

13. A compound selected from the group consisting of those having the formula:

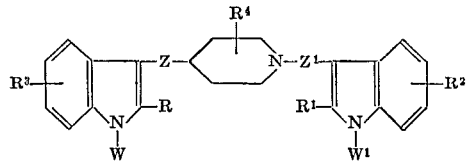

wherein W and W¹ are each selected from the group consisting of hydrogen, lower alkyl and phenyl(lower)alkyl; R and R¹ are each selected from the group consisting of hydrogen and lower alkyl; R² and R³ are each selected from the group consisting of hydrogen, halogen, lower alkoxy, and hydroxy; R⁴ is selected from the group consisting of hydrogen and lower alkyl; Z is an alkylene moiety selected from those having the formula:

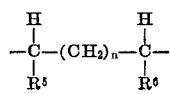

wherein $R^5$ and $R^6$ are each selected from the group consisting of hydrogen and methyl; and $n$ is an integer selected from the group consisting of zero and one; and Z' is of the formula:

14. 1-[2-(indol-3-yl)ethyl-4-[2-(2-isopropyl-indol-3-yl)-ethyl]pyridinium, bromide.

References Cited
UNITED STATES PATENTS

| | | | |
|---|---|---|---|
| 2,930,797 | 3/1960 | Anthony et al. | 260—294 |
| 3,136,770 | 6/1964 | Gray | 260—293 |
| 3,238,215 | 3/1966 | Fenitz | 260—293 |

JOHN D. RANDOLPH, Primary Examiner

U.S. Cl. X.R.

260—999, 296, 293.2, 294.7

PO-1050
(5/69)

UNITED STATES PATENT OFFICE
CERTIFICATE OF CORRECTION

Patent No. 3,462,440           Dated August 19, 1969

Inventor(s) Scott J. Childress and John L. Archibald

It is certified that error appears in the above-identified patent and that said Letters Patent are hereby corrected as shown below:

Column 3, line 15, for "2056 g", read --20.56--;
Column 4, line 44, for "80°", read -- >80° --;
Column 5, line 16-33, the reactants and final compounds set forth one below the other, should instead be tabulated as follows:

| REACTANTS | FINAL COMPOUNDS |
|---|---|
| (a) 5-hydroxy-3-[2-(4-pyridyl)ethyl]-indole and 3-(3-bromopropyl)indole | 1-[3-(3-indolyl)propyl]-4-[2-(5-hydroxy-3-Indolyl)-ethyl]-piperidine |
| (b) 6-chloro-3-[2-(4-[2-ethyl]-pyridyl)-ethyl]indole and 3-(3-bromo-propyl-2)indole | 1-[1-(3-indolyl)-1-methyl-ethyl]-2-ethyl-4-[2-(6-chloro-3-indolyl)ethyl]-piperidine |
| (c) 7-bromo-3-[2-(4-pyridyl)ethyl]indole and 3-(3-bromobutyl-1)indole | 1-[3-(3-indolyl)-1-methyl-propyl]-4-[2-(7-bromo-3-indolyl)ethyl]-piperidine |

SIGNED AND
SEALED
JUN 2 1970

(SEAL)
Attest:

Edward M. Fletcher, Jr.
Attesting Officer

WILLIAM E. SCHUYLER, JR.
Commissioner of Patents